US012215849B2

(12) United States Patent
Bukkems et al.

(10) Patent No.: US 12,215,849 B2
(45) Date of Patent: Feb. 4, 2025

(54) ILLUMINATION DEVICE, OPTICAL ELEMENT AND LUMINAIRE

(71) Applicant: SIGNIFY HOLDING B.V., Eindhoven (NL)

(72) Inventors: Peter Johannes Martinus Bukkems, Deurne (NL); Barry Mos, Bocholt (BE); Simon Jacobus Maria Kuppens, Geldrop (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/280,754

(22) PCT Filed: Feb. 28, 2022

(86) PCT No.: PCT/EP2022/054992
§ 371 (c)(1),
(2) Date: Sep. 7, 2023

(87) PCT Pub. No.: WO2022/189187
PCT Pub. Date: Sep. 15, 2022

(65) Prior Publication Data
US 2024/0167661 A1 May 23, 2024

(30) Foreign Application Priority Data
Mar. 11, 2021 (EP) .................................. 21162086

(51) Int. Cl.
*F21V 3/06* (2018.01)
*F21S 8/04* (2006.01)
(Continued)

(52) U.S. Cl.
CPC .................. *F21V 3/06* (2018.02); *F21S 8/04* (2013.01); *F21V 7/0083* (2013.01);
(Continued)

(58) Field of Classification Search
CPC . F21V 3/06; F21V 3/062; F21V 3/063; F21V 7/0066; F21V 7/0083; F21V 7/048;
(Continued)

(56) References Cited

U.S. PATENT DOCUMENTS 9,792,891 B2 * 10/2017 Swinkels ............. G10K 11/172
2010/0110674 A1 * 5/2010 Hysky ..................... E04B 9/366
362/253

(Continued)

FOREIGN PATENT DOCUMENTS

CH 697541 B1 11/2008
CN 203068203 U 7/2013
(Continued)

*Primary Examiner* — Erin Kryukova

(57) ABSTRACT

An illumination device (100) provided with a support structure (10), an array of a plurality of spatially separated solid state lighting elements (11) mounted on a first side of the support structure (10), as well as an optical element (12) made from a light diffusing material for diffusing light emitted by the array of the plurality of spatially separated solid state lighting elements (11), the optical element (12) being mounted on the first side of the support structure and provided with a pattern formed of an array of a plurality of recessed portions (120) and an array of a plurality of elevated portions (122).

15 Claims, 18 Drawing Sheets

(51) Int. Cl.
*F21V 7/00* (2006.01)
*F21Y 105/10* (2016.01)
*F21Y 113/00* (2016.01)
*F21Y 115/10* (2016.01)

(52) U.S. Cl.
CPC ....... *F21Y 2105/10* (2016.08); *F21Y 2113/00* (2013.01); *F21Y 2115/10* (2016.08)

(58) Field of Classification Search
CPC ......... F21V 7/024; F21V 7/48; G02B 5/0247; G02B 6/0066; G02B 6/0073; G02B 6/0011; G02B 6/0035; G02B 6/0036; G02B 6/0045; G02B 6/0038; F21S 8/04; G02F 1/133603; E04B 9/32; F21Y 2105/10; F21Y 2115/10; F21Y 2113/00

See application file for complete search history.

(56) References Cited

U.S. PATENT DOCUMENTS

| | | |
|---|---|---|
| 2011/0249438 A1 | 10/2011 | Han et al. |
| 2011/0292655 A1 | 12/2011 | Ing et al. |
| 2012/0051050 A1 | 3/2012 | Lee et al. |
| 2013/0201690 A1 * | 8/2013 | Vissenberg ............... F21V 5/10 362/296.07 |
| 2014/0362566 A1 | 12/2014 | Tischler et al. |
| 2018/0017231 A1 | 1/2018 | Shih |

FOREIGN PATENT DOCUMENTS

| | | | | |
|---|---|---|---|---|
| KR | 100755010 B1 | * | 9/2007 | |
| KR | 20090040969 A | * | 4/2009 | ........... E04B 9/0464 |
| WO | 2012042429 A2 | | 4/2012 | |
| WO | 2013001430 A1 | | 1/2013 | |
| WO | 2013121907 A1 | | 8/2013 | |
| WO | WO-2013111717 A1 | * | 8/2013 | ................ C08F 2/32 |
| WO | 2015184457 A1 | | 12/2015 | |
| WO | 2016073207 A1 | | 5/2016 | |

* cited by examiner

ILLUMINATION DEVICE, OPTICAL ELEMENT AND LUMINAIRE

CROSS-REFERENCE TO PRIOR APPLICATIONS

This application is the U.S. National Phase application under 35 U.S.C. § 371 of International Application No. PCT/EP2022/054992, filed on Feb. 28, 2022, which claims the benefit of European Patent Application No. 21162086.9, filed on Mar. 11, 2021. These applications are hereby incorporated by reference herein.

TECHNICAL FIELD

The disclosure relates to an illumination device composed of a plurality of reflectors, each reflector interacting with a light source for emitting light.

BACKGROUND OF THE DISCLOSURE

An illumination device as outlined above is for example disclosed in the International patent application no. WO2012/042429. The illumination device described therein allows the use of a reflector part composed of a plurality of concave shaped reflectors in different number, shapes and sizes (i.e. linear and/or area configurations). Such illumination device provides a good-quality lighting solution for direct replacement of so-called T5 fluorescent lamps in office and other indoor applications. The illumination device according to WO2012/042429 consists of a reflector part formed of several concave shaped reflectors, wherein each reflector interacts with a LED light source.

The thickness dimension of an illumination device according to WO2012/042429 is substantial, increasing its weight, making transportation and mounting or installation difficult and expensive. Furthermore, the reflector part is a complex and thus equally expensive component. Also, there is a large light intensity contrast between the small very bright light spots within the reflector part and the remainder of the reflector part, resulting in an unpleasant look and feel experience.

It is desirable to provide an illumination device of the above known kind, which is of a less complex and expensive construction and which is yet capable of emitting a more uniform light emission distribution of diffuse lighting.

SUMMARY OF THE DISCLOSURE

Accordingly, an illumination device is proposed comprising a support structure having a first side with mounted thereon an array of a plurality of spatially separated solid state lighting elements, and an optical element made of a solid, light transmissive, light diffusing, foam material, wherein the optical element is provided with a pattern of concaves, essentially each concave being formed by a recessed portion comprising a closed bottom wall, an elevated portion having an apex bordering an light exit window downstream and opposite to the closed bottom wall, and a circumferential side wall extending from the closed bottom wall to the light exit window, wherein the plurality of spatially separated solid state elements is arranged outside and upstream of the concaves and conformal to said pattern of concaves.

The optical element, being mounted directly on the array of plurality of spatially separated solid state lighting elements, combines the functionality of a light reflector part, attributed by the recessed portions functioning as reflectors, and that of a light diffusor part, attributed by the light diffusing material. In addition, the optical element provides a partial shielding of light, in particular at high angles, thus providing lower glare. Next to a less complex configuration, also a reduction in constructional dimensions can be achieved, both resulting in simple yet less expensive design.

It is further noted that the expression "essentially each concave" means at least 90% of the number of concaves, for example up to and including all concaves. The expression downstream (and upstream) is related to the propagation direction of light as emitted by the solid state light sources and the emission direction of the illumination device. Concaves typically widen from the closed bottom wall to the light exit window, or in other words, taper from the open light exit window to the closed bottom wall, and are typically shaped as reflector cups. The light exit window may be open or may be closed with, for example, a transparent plate or optics. Conformal to concaves can be one of conformal to the recessed portions or conformal to the elevated portions.

The illumination device may have the feature that the optical element has a back surface and a front surface opposite to the back surface of the optical element, wherein the optical element is mounted with said back surface on said first side of the support structure and downstream of the solid state elements, and wherein a maximum thickness D between the back surface and the front surface at the apex of the elevated portions of the optical element is at least two times larger than the thickness Tr between the back surface and the front surface at the recessed portions. The thickness Tr is the measured (local) thickness in/of bulk material in a direction perpendicular to the light exit window and closed bottom wall. At least the whole front surface is downstream of the solid state elements, i.e. the solid state elements neither protrude from the back surface through the front surface into the concaves, nor are arranged in the concaves, but are completely upstream, i.e. behind, the front surface and even optionally upstream of the whole back surface. Still further, the optical element is only provided with concaves having a closed bottom wall and essentially free from through holes, i.e. the back surface and front surface are essentially closed surfaces, optionally except for mounting holes for mounting the optical element to the support structure.

At the recessed portions light is emitted as a beam of relatively high intensity and in a relatively slightly diffused manner, light of said beam is partly collimated by the side walls. Yet, through the elevated portions relatively highly diffused light of relatively low intensity is emitted. This combined emission of light through recessed and elevated portions, with the indicated minimal difference in distance, provides an attractive light distribution with low glare, if any at all. The optical element has local thickness, measured as the shortest local distance between the back surface and the front surface of the optical element, the local thickness of the optical element is larger at the elevated portions than at the recessed portions. By arranging the array of the plurality of spatially separated solid state lighting elements conformal to the array of the plurality of recessed portions or conformal to the array of the plurality of elevated portions is, the provided light pattern can be varied.

The illumination device may have the feature that the thickness Tr is in between 0.3*D and 0.5*D, wherein D is the maximum thickness of the optical element at the apex of the elevated portion. This could alternatively be expressed as that the illumination device may have the feature that a maximum depth of the plurality of recessed portions amounts 50-70% of a maximum thickness of the optical element.

The illumination device may have the feature that the back surface is essentially flat. The advantage is obtained of easily free positioning of solid state elements with respect to concaves to adjust/vary light pattern. The expression "essentially flat" means without protrusions and/or recesses, yet the illumination device may have the feature that the back surface comprises relatively shallow recesses configured to accommodate partly or completely recessed or embedded solid state elements. Yet, when recessed or embedded solid state elements are comprised, said solid state elements neither extend through nor protrude from said front surface.

The illumination device may have the feature that the optical element is made in one piece, which enables a relatively easy manufacture and/or assembly of the illumination device.

The illumination device may have the feature that the array of the plurality of recessed portions is conformal to the array of the plurality of spatially separated solid state lighting elements. Then, a respective solid state light element of the array of separated solid state lighting elements is associated with and aligned with a respective closed bottom wall of a respective reflector cup of the array of reflector cups, wherein said respective closed bottom wall is arranged in between said respective solid state element and said respective light exit window. So, in a preferred example, the array of the plurality of recessed portions is conformal to the array of the plurality of spatially separated solid state lighting elements, whereas in another preferred example the array of the plurality of elevated portions is conformal to the array of the plurality of spatially separated solid state lighting elements. With conformal it is meant that the orientation and position of the array of recessed portions or elevated portions overlap and are aligned with the orientation and position of the array of the plurality of spatially separated solid state lighting elements.

In either preferred examples, the array of the plurality of recessed portions is facing away from the support structure or the array of the plurality of recessed portions is facing towards the support structure. These configurations allow for different light distributions but also a different look of the luminaire, where a smooth exit surface provides a homogenous lighting experience.

In a preferred example, the optical element is made from a solid foam material, preferably a solid closed-cell, or bubble, foam material, in particular having a closed-cell volume of at least 80 volume-%, more in particular in the range of 90-96 volume-% and preferably of 93 volume-%. The air-foam boundaries between the closed-cells and the foam material act as small Fresnel reflectors, scattering the light being emitted by the solid state lighting elements as a uniform light emission distribution of diffuse light.

When in a further example of the disclosure, the closed-cells have a diameter in the range of 0.2-1.7 mm, an optimal light scattering effect is achieved. Closed-cell, also referred to as bubble, diameters less than 0.05 mm result in undesired high reflection and too much scattering/diffusion, while in the invention is aimed at high transmission and some level of diffusion obtainable by closed-cell diameters larger than 0.2 mm, i.e. in the order of about 1 mm. When the closed-cell is larger than 1.7 mm the transmission through the mechanically closed but optically transmissive (bottom wall) of the foam material is favorably high, yet then the obtained scattering effect is too small and the risk on undesired glare is too high.

In a further example, the pattern formed of the array of the plurality of recessed portions and the array of the plurality of elevated portions have a polygon-shaped, an elliptical-shaped or a pyramidal-shaped circumference.

The plurality of recessed portions are provided with a recessed circumferential side wall arranged under an angle α with respect to the plane of the structure, with a in a range of 50° to 80°, preferably in the range of 55° to 70°. Herewith a uniform light emission distribution of diffuse light is obtained, whilst sufficiently shielding off the light emission at higher angles towards the (office) space wherein the illumination device is installed for environmental compliance. The recessed portions are bordered by the closed bottom wall, the light exit window and the circumferential side wall, and taper in the upstream direction from the light exit window to the closed bottom wall.

In a further example, a maximum depth of the plurality of recessed portions amounts 50-70% of a maximum thickness of the optical element, and in particular the optical element typically has a thickness of 20-30 mm, in particular 25 mm, and the thickness of the optical element at the location of, i.e. in front of, the solid state lighting element, for example an LED, is in the range of 6-15 mm, in particular 9-12 mm, such as 10 mm, the LED itself typically has a height of about 0.7-1.0 mm.

In a further aspect, the solid foam material has a light transmissivity T in the range of 50%-80%, such as about 60-65%, such as 63%. The transmissivity T is dependent a.o. on the size and density of the closed cells in the foam and the thickness of the foam layer. Yet, the amount of light issued from the foam (for example, at the location of the solid state element) also is dependent on the reflectivity of the substrate on which the solid state lighting element is arranged. A higher transmissivity renders a higher efficacy of the lighting device, yet less scattering and hence a less spreading effect by the recessed portions (cups), while too low transmissivity renders the lighting device to become too inefficient as too much light losses occur as a result of too much internal reflection of light within the foam. For the abovementioned range of transmissivity it is considered that the reflectivity of the back foil or substrate is at least 90%.

In a preferred example, the solid foam material is polyurethane.

In a further example according to the disclosure, the support structure is provided with a further array of a plurality of spatially separated solid state lighting elements mounted on the first side of the support structure and the optical element is provided with an auxiliary recess portion conformal to the further array of a plurality of spatially separated solid state lighting elements. Typically each reflector is associated with a respective solid state lighting elements, e.g. an LED, for a desired interaction.

Also in this example, in two embodiments are feasible with the auxiliary recess portion either facing away from the support structure or facing towards the support structure. These configurations allow for different illuminations, either diffuse or homogenous with two distinct sets of solid state lighting elements, thus providing additional functionality of the illumination device thus implemented.

As a further aspect, the disclosure also pertains to an optical element for use in an illumination device as described herein, the optical element being made of a solid, light transmissive, light diffusing, foam material and provided with a pattern of concaves, wherein essentially each concave is formed by a recessed portion comprising a closed bottom wall, an elevated portion bordering a light exit window downstream and opposite to the closed bottom wall, and a circumferential side wall extending from the closed bottom wall to the light exit window.

The invention further relates to a luminaire. The support structure may contain or comprise electric circuitry, such as a driver, and electric components for providing electric power to the several components of the illumination device, in particular the spatially separated solid state lighting elements, which, for example, are mechanically and electrically mounted to a first, upper surface of the support structure. The support structure can be composed entirely or partly as a printed circuit board (PCB). The support structure may be part of a housing of the illumination device and can be mounted with its second, other side to a ceiling of for example an office room, the second side being opposite from the first side on which the solid state lighting elements are mounted. The combination of the lighting device with at least one of the group comprising a housing, driver and components for providing electric power, may be considered a luminaire.

BRIEF DESCRIPTION OF THE DRAWINGS

The disclosure will now be discussed with reference to the drawings which are not necessarily to scale and in which some dimensions will be exaggerated for explanatory reasons, which show in.

DETAILED DESCRIPTION OF THE DRAWINGS

Figure 1A:
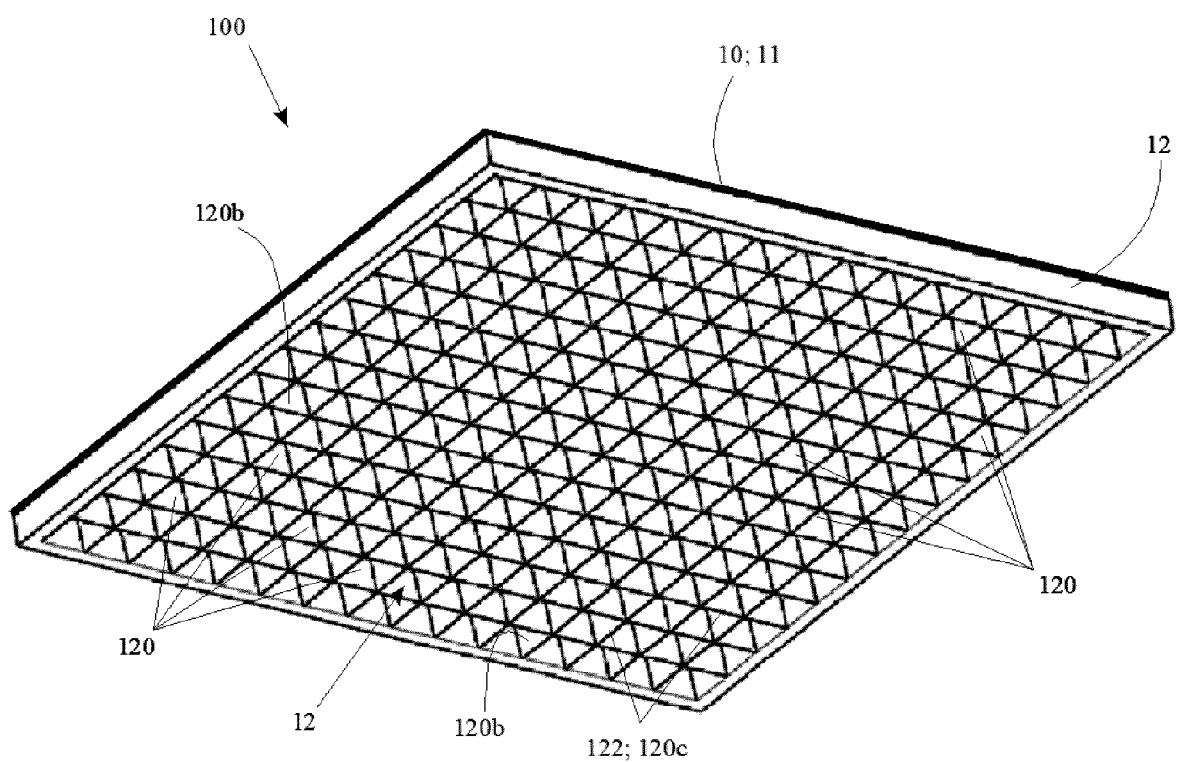
FIGS. 1a and 1b schematically illustrate an example of an embodiment of an illumination device according to the present disclosure.

For a proper understanding of the disclosure, in the detailed description below corresponding elements or parts of the disclosure will be denoted with identical reference numerals in the drawings.

Figure 1B:
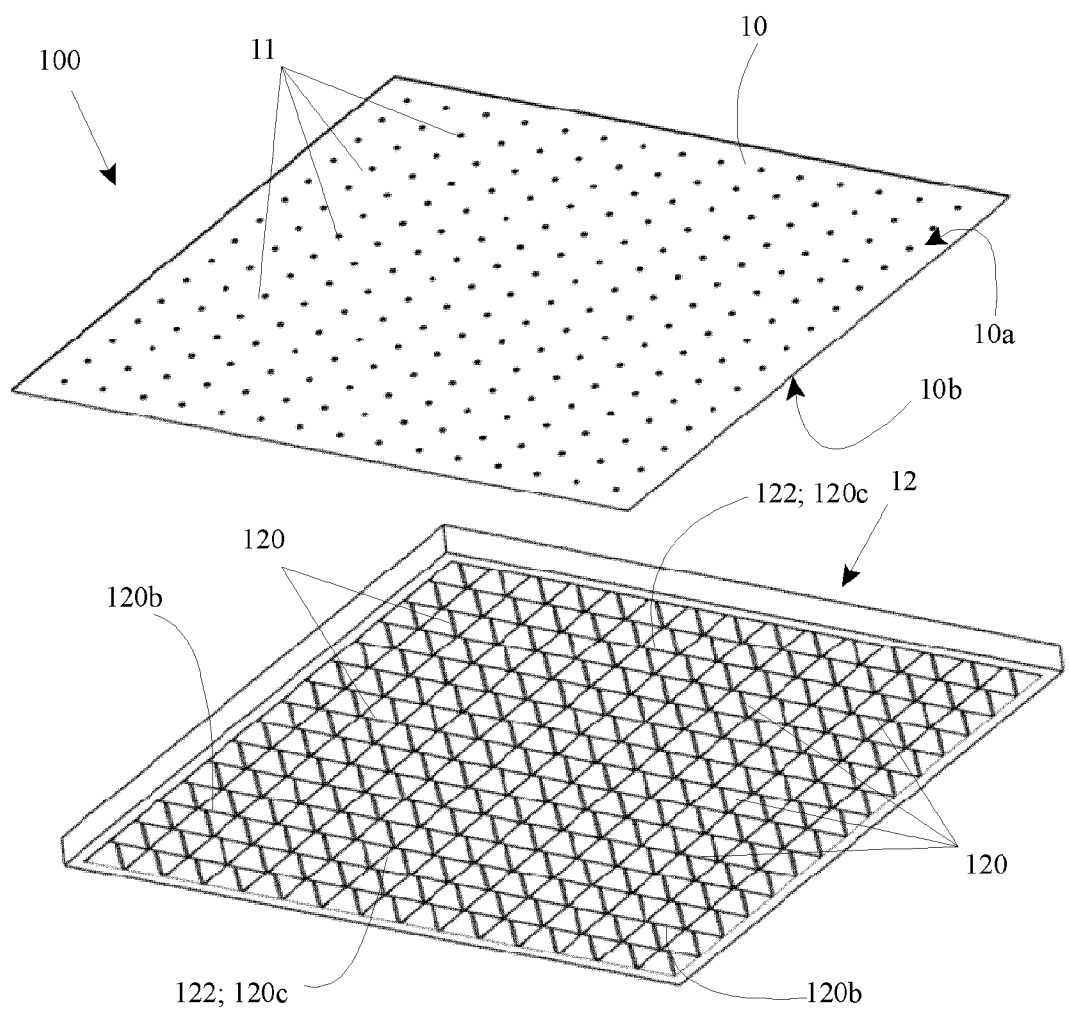

FIG. 1a, combined with FIG. 1b, schematically illustrates a non-limiting example of an embodiment of an illumination device according to the present disclosure. Reference numeral 100 depicts the illumination device being composed of a support structure and an optical element 12 mounted thereon. The support structure 10 is provided with a plurality of solid state lighting elements 11. The plurality of solid state lighting elements 11 are spatially separated from each other.

For example, the plurality of spatially separated solid state lighting elements 11 are mounted on the support structure 10 in a two-dimensional array of rows and columns, as shown in FIG. 1b. In other embodiments, the plurality of spatially separated solid state lighting elements 11 can be arranged in a one-dimensional orientation on the support structure 10, thus forming a single line or strip of solid state lighting elements 11. In another example, even a three-dimensional orientation is feasible, with the support structure being formed as a three-dimensional profile conformal to a shape of an underlying construction to which the complete illumination device 100 is to be mounted. To this end, the support structure 10 can be made (in part) of a flexible material, allowing the support structure to conform to the shape of the underlying construction.

When powered or activated, the plurality of spatially separated solid state lighting elements 11 emit visible light. The support structure 10 may contain or comprise electric circuitry, such as a driver, and electric components for providing electric power to the several components of the illumination device 100, in particular the spatially separated solid state lighting elements 11, which are mechanically and electrically mounted to a first, upper surface 10a of the support structure 10. The support structure 10 can be composed entirely or partly as a printed circuit board (PCB).

The support structure 10 may be part of a housing (not depicted) of the illumination device 100 and can be mounted with its second, other side 10b to a ceiling 1000 of for example an office room, the second side 10b being opposite from the first side 10a on which the solid state lighting elements 11 are mounted. The combination of the lighting device with at least one of the group comprising a housing, driver and components for providing electric power, may be considered a luminaire.

The number of plurality of solid state lighting elements 11 can be arbitrarily chosen, and can be 1 or 2, but preferably at least 2. Suitable examples of an illumination device 100 for example for use in office spaces may comprise 10 or more, even 20, 30+ solid state lighting elements 11 per illumination device 10 depending on the size and application of the illumination device.

Returning to FIGS. 1a and 1b, reference numeral 12 denotes an optical element. The optical element 12 is made from a light diffusing material, thus capable for diffusing light emitted by the array of the plurality of spatially separated solid state lighting elements 11. In a preferred example, the optical (diffuser) element 12 is made from a solid foam material, such as polyurethane. Other examples are so-called microcell urethane foam (PORON), silicone foams and cross linked polyethylene foam (XLPE).

The optical (diffuser) element 12 has a back surface 12a and a front surface 12b (both denoted with a dashed line), the front surface 12b being opposite from the back surface 12a. According to the disclosure, the optical element 12 is directly mounted with its back surface 12a on the first side 10a of the support structure 10. Preferably, the optical (diffuser) element 12 is formed as a foam block having longitudinal dimensions more or less identical to the longitudinal dimensions of the support structure 10. The thickness D (see also FIG. 2b) of the foam-block shaped optical element 12 can be arbitrarily chosen, but such that it provides most of the mechanical strength of the complete construction of the illumination device 100. Accordingly, the mechanical strength of the complete construction does not necessarily be provided by the support structure 10.

The optical (diffuser) element 12 is provided with a pattern formed of an array of a plurality of recessed portions 120 and an array of a plurality of elevated portions 122. In an example shown in FIGS. 1a-1b as well as in FIGS. 2a and 2b, both the array of the plurality of recessed portions 120 and the array of the plurality of elevated portions 122 are provided in the front, other side 12b of the optical element 12, away from the back surface 12a and the side 10b of the support structure 10 on which the solid state lighting elements 11 are mounted. See FIGS. 2a and 2b for more detail.

Figure 2A:
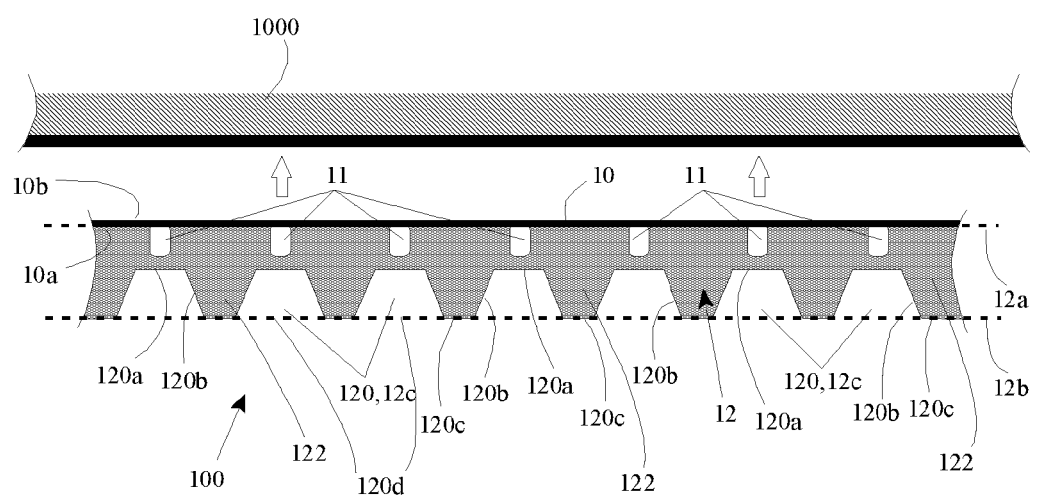
FIGS. 2a-2b and 2c-2e schematically illustrate details of two examples of different embodiments of an illumination device according to the present disclosure.
Figure 2B:
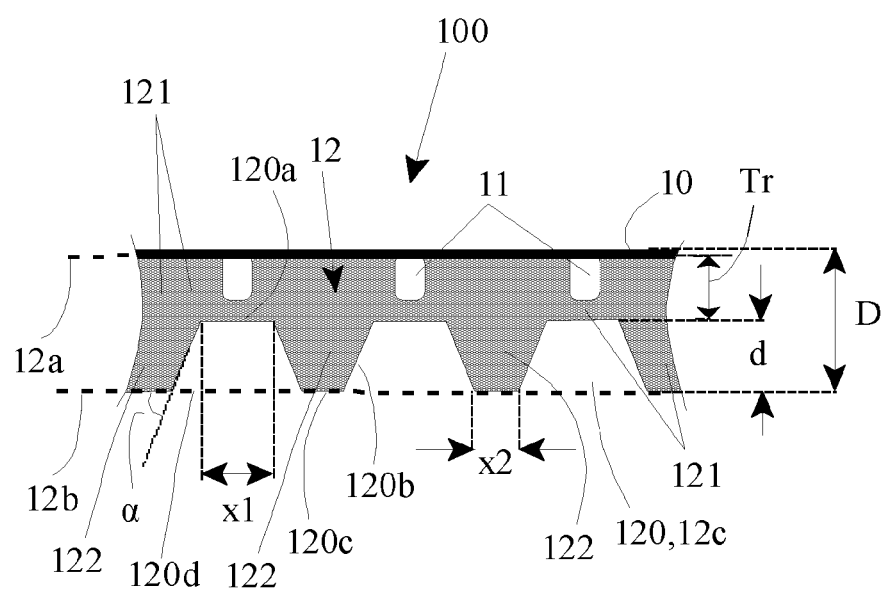
Figure 2C:
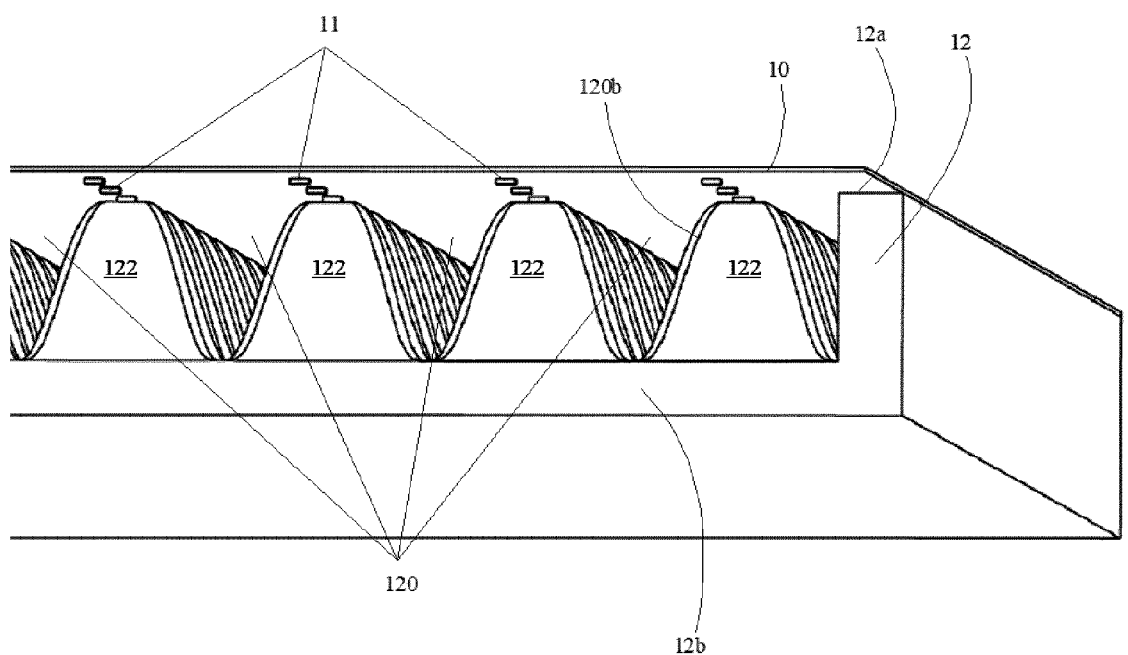
Figure 2D:
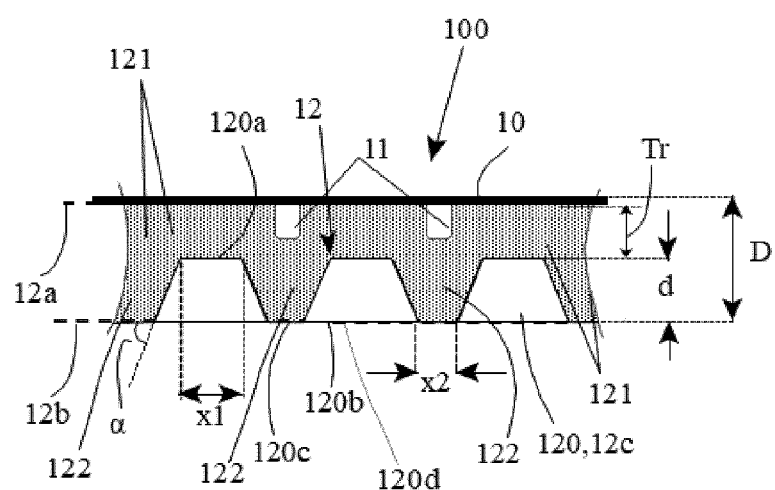

However in another functional example as depicted in FIG. 2c-2d, both the array of the plurality of recessed portions 120 and the array of the plurality of elevated portions 122 are provided in the back surface 12a of the optical element 12, facing towards the side 10b of the support structure 10 on which the solid state lighting elements 11 are mounted.

Figure 2E:
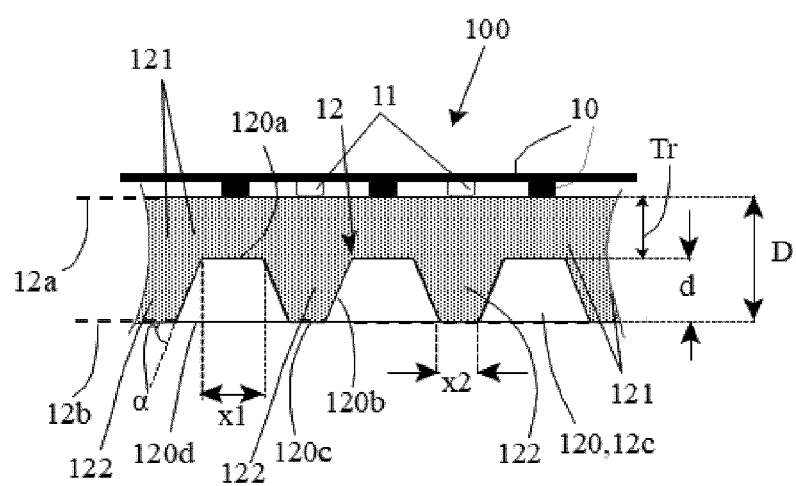

In the example of FIGS. 1a-1b and 2a-2b, the array of the plurality of recessed portions 120 is conformal to the array of the plurality of spatially separated solid state lighting elements 11, whereas in the example of FIG. 2c-2d the array of the plurality of elevated portions 122 is conformal to the array of the plurality of spatially separated solid state lighting elements 11. With the term 'conformal' is meant, that the array of the plurality of recessed portions 120 (or elevated portions 122) and the array of the plurality of spatially separated solid state lighting elements 11 overlap each other, with each solid state lighting element 11 facing a recessed portion 120 (FIGS. 2a-2b) or an elevated portion 122 (FIGS. 2c-2e). As such in both examples, the pattern composed of the arrays of the plurality of recessed portions 120/elevated portions 122 can be configured in a two-dimensional array, or in a one-dimensional line (or single row) design, or even in a three-dimensional shape. In FIG. 2a-2d the plurality of spatially separated solid state lighting elements 11 are partly embedded or recessed at the back surface 12a into the optical element 12, while in FIG. 2e the plurality of spatially separated solid state lighting elements 11 are mounted in a non-recessed manner on the back surface 12a of the optical element 12.

The optical element 12, being mounted directly on the support structure 10, functions as a light reflector part, attributed by the recessed portions 120, which each function as an individual reflector for the respective, corresponding solid state light emitting device 11. In addition, optical element 12 functions as a light diffusor part, attributed by the light diffusing material being a solid foam material. In addition, the optical (diffuser) element 12 provides a partial shielding of light, in particular at high angles, thus providing lower glare. Next to a less complex configuration, also a reduction in constructional dimensions can be achieved, both resulting in simple yet less expensive design.

Preferably, the solid foam material of the optical element is a solid closed-cell foam material, in particular having a closed-cell volume of at least 80 volume-%, more in particular of 90-96 volume-% and preferably of 93 volume-%. The air-foam boundaries between the closed-cells 121 and the foam material of the optical element 12 act as small Fresnel reflectors, scattering the light being emitted by the solid state lighting elements as a uniform light emission distribution of diffuse light.

Preferably, the closed-cells 121 have a diameter in the range of 0.2-1.7 mm, and herewith an optimal light scattering effect is achieved. The closed-cells 121 preferably have a uniform diameter, but more preferable a diameter distributed within the 0.2-1.7 mm range.

The optical element comprises concaves 12c comprising recessed portions or reflector cups 120 provided in the front side 12b of the optical element 12. The recessed portions 120 have an open light exit window 120d and opposite thereto a closed bottom wall 120a, which faces the corresponding solid state light emitting device 11 (FIG. 1a-2b). The optical element 12 has a thickness of about 10 mm in front of the solid state lighting element 11, i.e. D-d 10 mm, wherein here D is the maximum thickness dimension of optical element 12 and d is the depth dimension of recessed portion 120 of optical element 12. The closed bottom wall 120a preferably has a square or rectangular surface area, with x1 preferably being 14 mm×14 mm. The open recessed portions or reflector cups 120 are further bound by a circumferential side wall 120b. Between adjacent recessed portions or reflector cups 120 of the array of plurality of recessed portions or reflector cups 120 the array of elevated portions 122 are present, which constitute in this example intermediate wall sections 120c. The elevated portions 122/intermediate wall sections 120c are flush with the front, other side 12b of the optical element 12 and may have a length dimension x2 of 2 mm, thus preventing the creation of an undesired shadow effect in under large angles. The open recessed portions or reflector cups 120 together with the elevated portions 122/the intermediate wall sections 120c function as the light emission window of the illumination device 100.

FIGS. 3, 4, 5a-5b, 6a-6c and 7a-7b show several further examples of the optical (diffuser) element, denoted with reference numerals 12'-12''-12'''. In these examples, which conform with FIGS. 2a and 2b, both the array of the plurality of recessed portions 120 and the array of the plurality of elevated portions 122 forming intermediate wall sections 120c are provided in the front, other side 12b of the optical element 12, away from the back surface 12a and the side 10b of the support structure 10 on which the solid state lighting elements 11 are mounted. Furthermore, in these embodiments, the array of the plurality of recessed portions 120 is conformal to the array of the plurality of spatially separated solid state lighting elements 11 mounted on the support structure 10.

Figure 3:
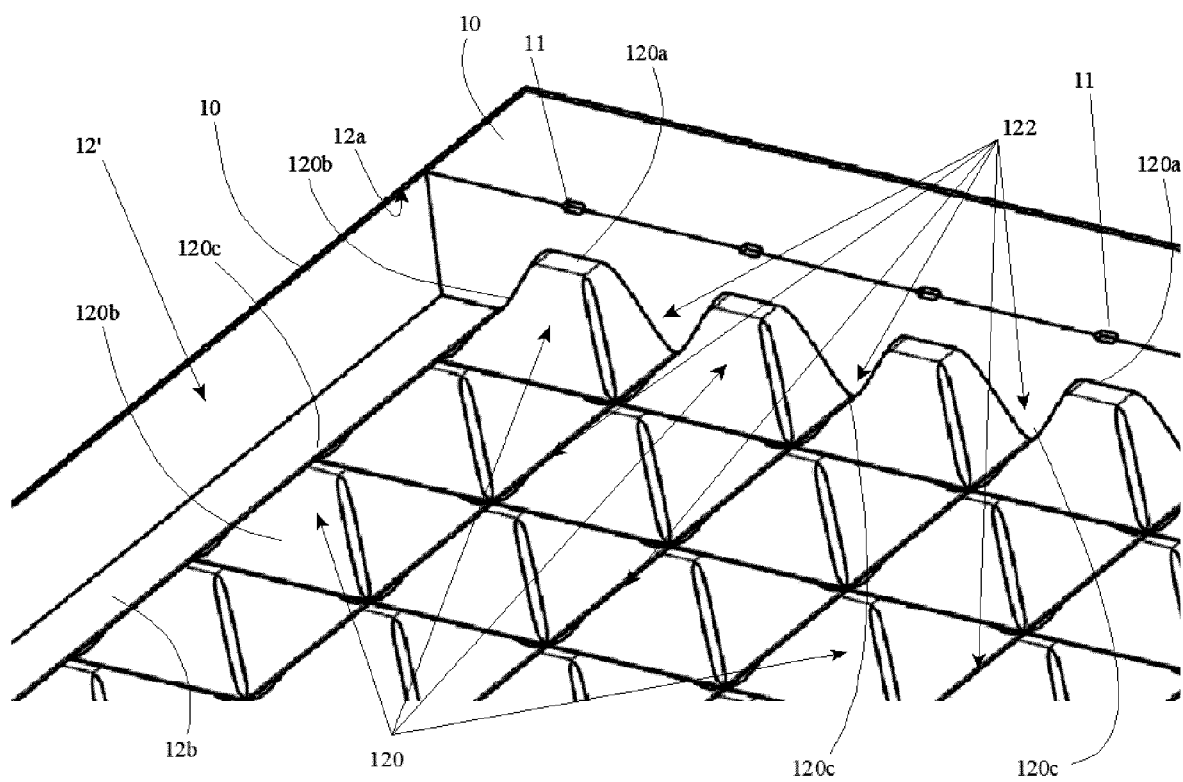
FIG. 3 schematically illustrates another example of an embodiment of an illumination device according to the present disclosure.
Figure 5A:
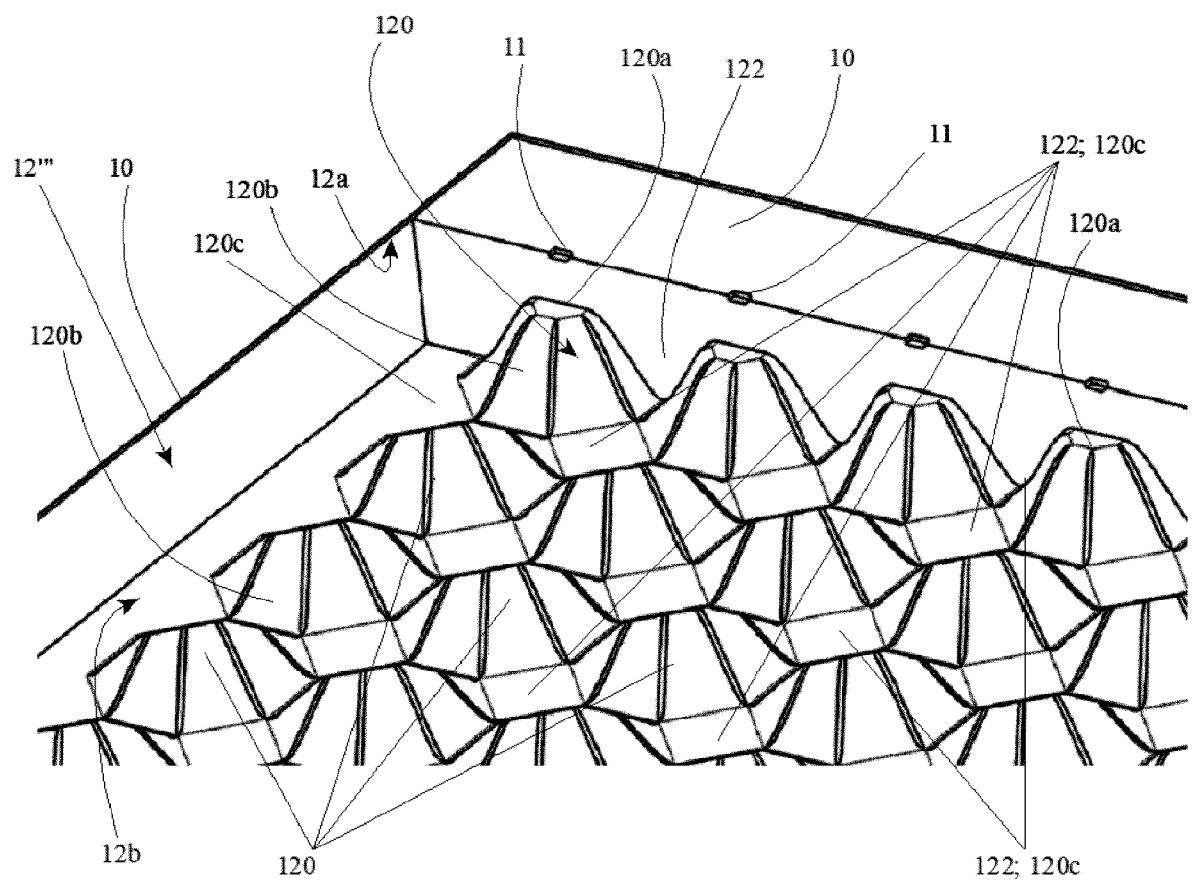
FIGS. 5a and 5b schematically illustrate yet another example of an embodiment of an illumination device according to the present disclosure.
Figure 5B:
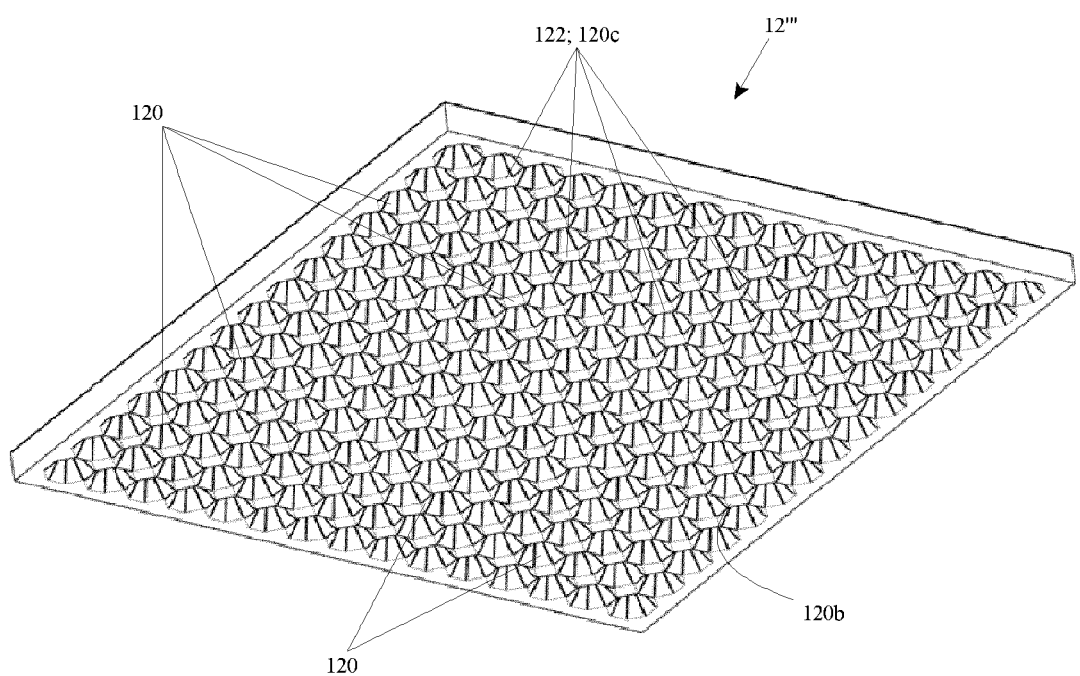
Figure 6A:
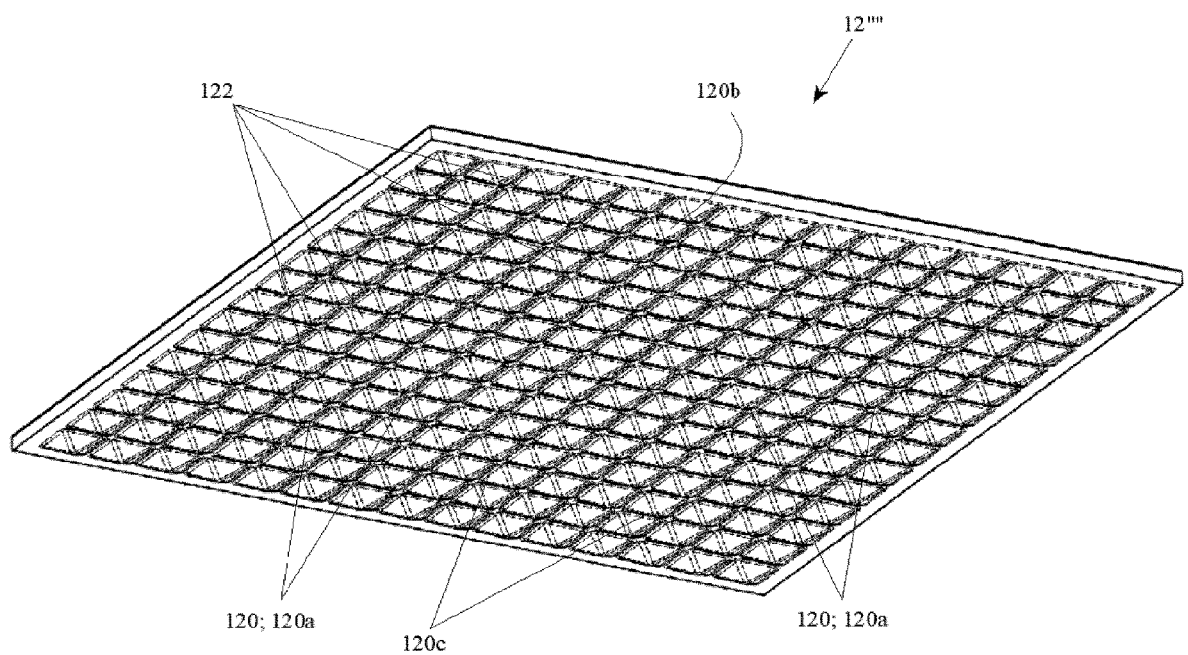
FIGS. 6a-6c schematically illustrate yet another example of an embodiment of an illumination device according to the present disclosure.
Figure 6B:
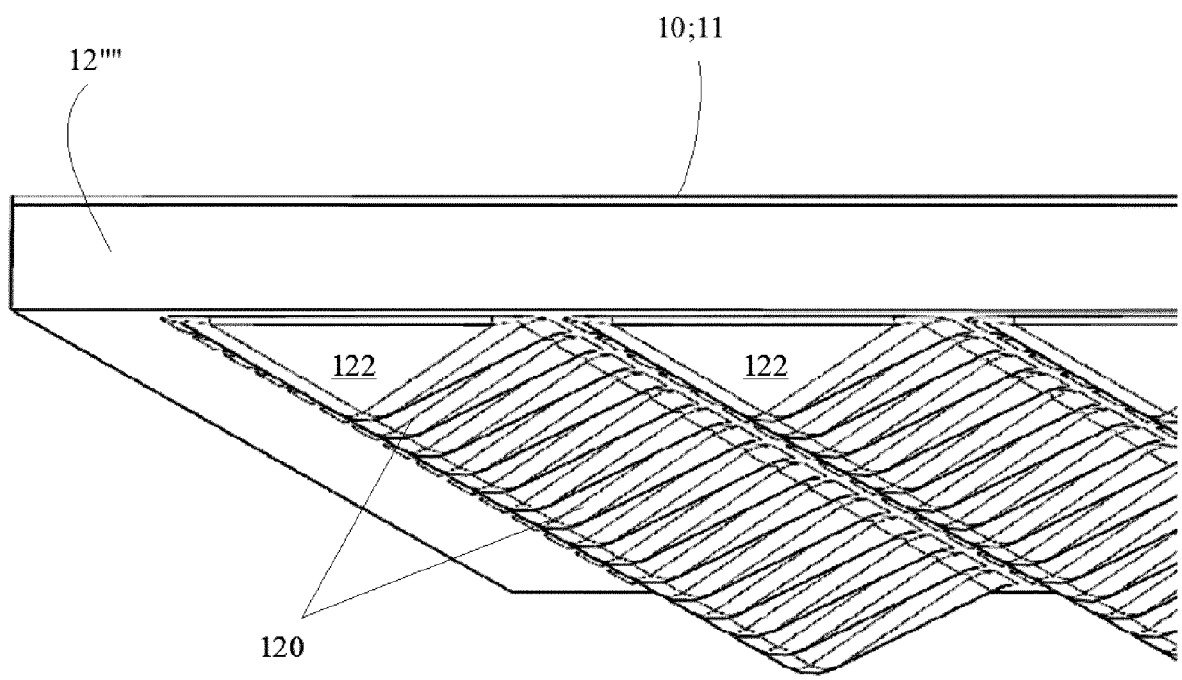
Figure 6C:
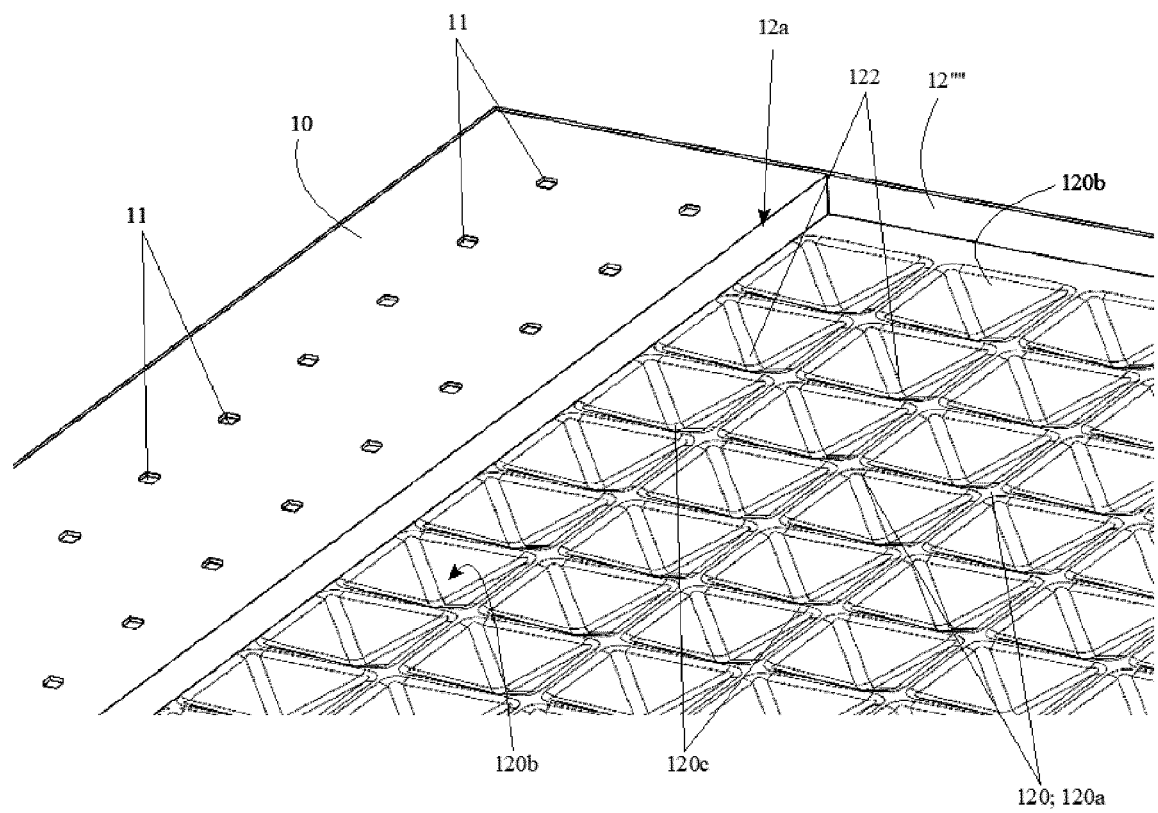

In a first example, the plurality of recessed portions 120 of the optical element 12' have a polygon-shaped circumference. FIG. 3 details such variant with square-shaped recessed portions 120. FIGS. 5a-5b details another variant of an optical element 12''' with octagon-shaped recessed portions 120. It should be noted that also other polygon-shaped variants can be implemented, which provide a different light emission distribution of diffuse and scattered light. FIGS. 6a, 6b and 6c depict a variant of an optical element 12'''' with pyramid-shaped recessed portions 120 and likewise pyramid-shaped elevated portions 122 with the apex thereof denoted with reference numeral 120c as the apex can be considered as an intermediate wall section between adjacent pyramid-shaped recessed portions 120.

Figure 4:
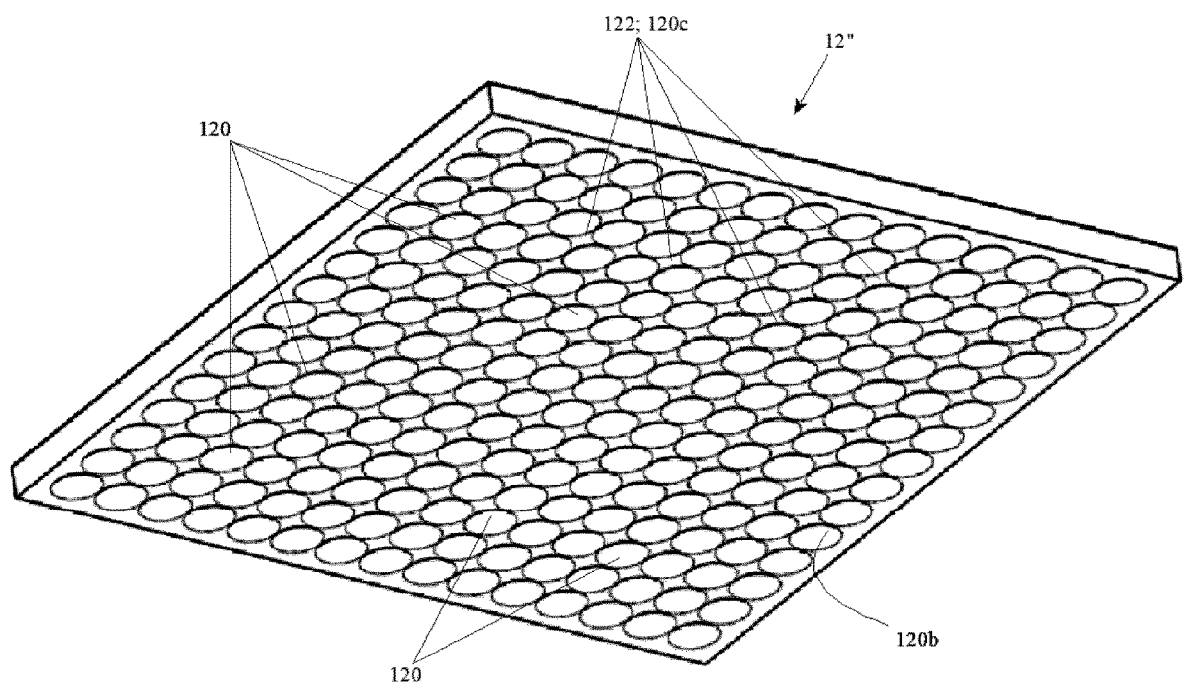
FIG. 4 schematically illustrates a further example of an embodiment of an illumination device according to the present disclosure.

In the example of FIG. 4, the plurality of recessed portions 120 of the optical element 12'' have an elliptical-shaped circumference, in particular a circular circumference. Another example of the plurality of recessed portions 120 having an elliptical-shaped circumference is shown in FIGS. 1a-1b and 2a-2b, depicting circular recessed portions 120 with a cone-shape.

Figure 7A:
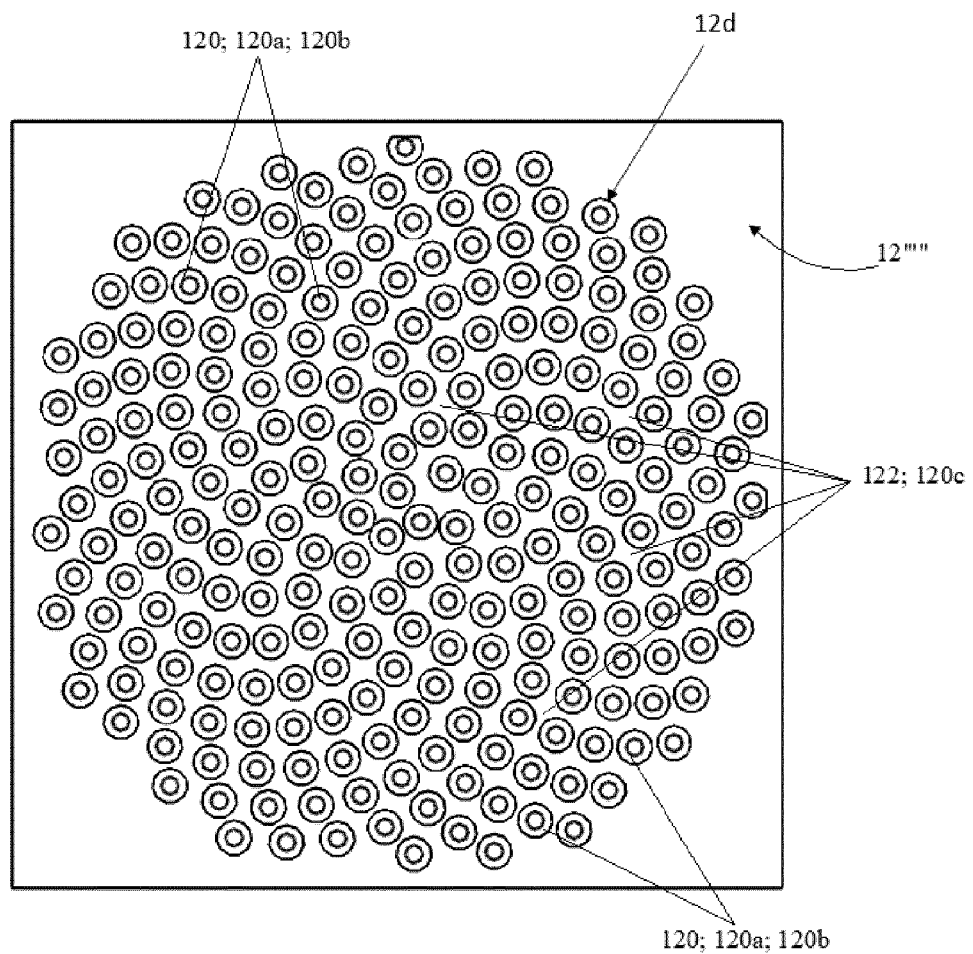
FIGS. 7a and 7b schematically illustrate yet another example of an embodiment of an illumination device according to the present disclosure.
Figure 7B:
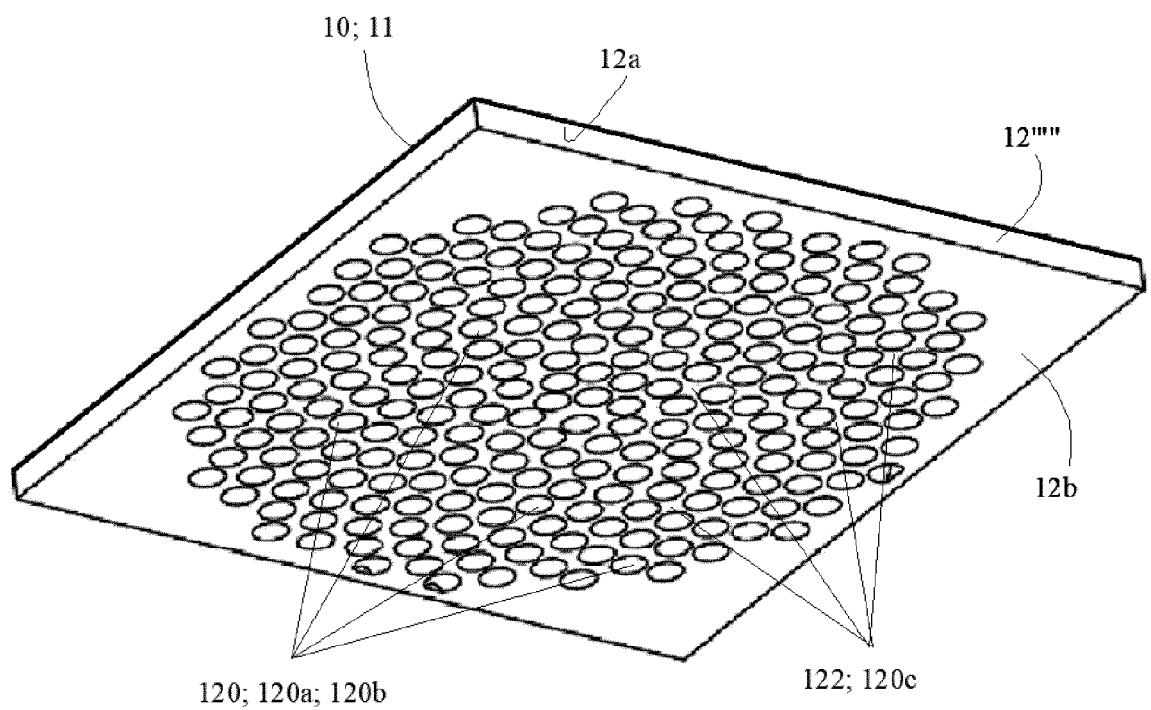

Whereas the examples of FIGS. 3, 4, 5a-5b, 6a-6c depict the array of the plurality of recessed portions 120 and the array of the plurality of elevated portions 122, both having a regular pattern of rows and columns, the example of FIGS. 7a and 7b depict an irregular pattern of the plurality of concaves 12d comprising recessed portions 120, and the plurality of elevated portions 122, the latter forming intermediate wall sections 120c. In the example of FIGS. 7a-7b the plurality of recessed portions 120 have a circular shape as in FIG. 4, yet the array thereof has an irregular, pointillism pattern for example according to a Fibonacci sequence.

Note however, that these examples of FIGS. 3, 4, 5a-5b, 6a-6c and 7a-7b can be configured in a reversed configuration as illustrated in FIG. 2c-2d, that is with both the array of the plurality of recessed portions 120 and the array of the plurality of elevated portions 122 being provided in the back surface 12a of the optical element 12, facing towards the side 10b of the support structure 10 on which the solid state lighting elements 11 are mounted. For the optimal illuminance effect, in these reversed embodiments, the array of the plurality of elevated portions 122 should be conformal (meaning directly facing or overlapping) to the array of the plurality of spatially separated solid state lighting elements 11 mounted on the support structure 10.

Figure 8A:
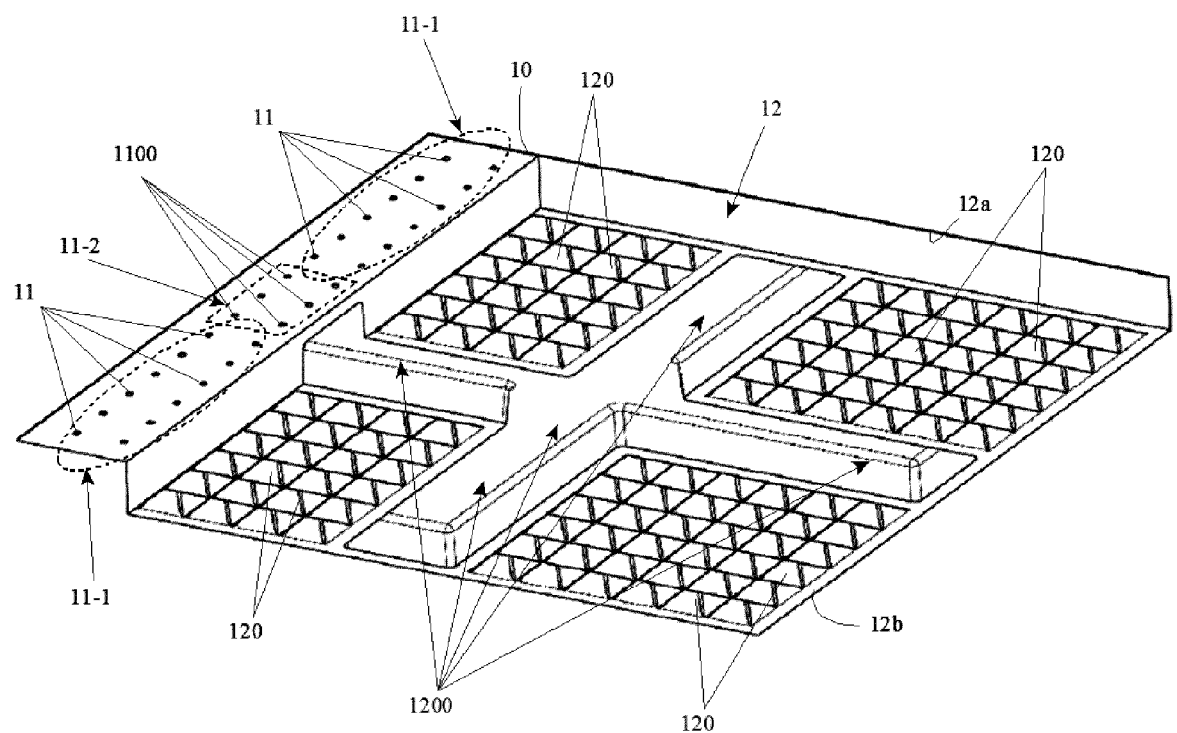
FIGS. 8a and 8b schematically illustrate two further embodiments of an illumination device according to the disclosure.
Figure 8B:
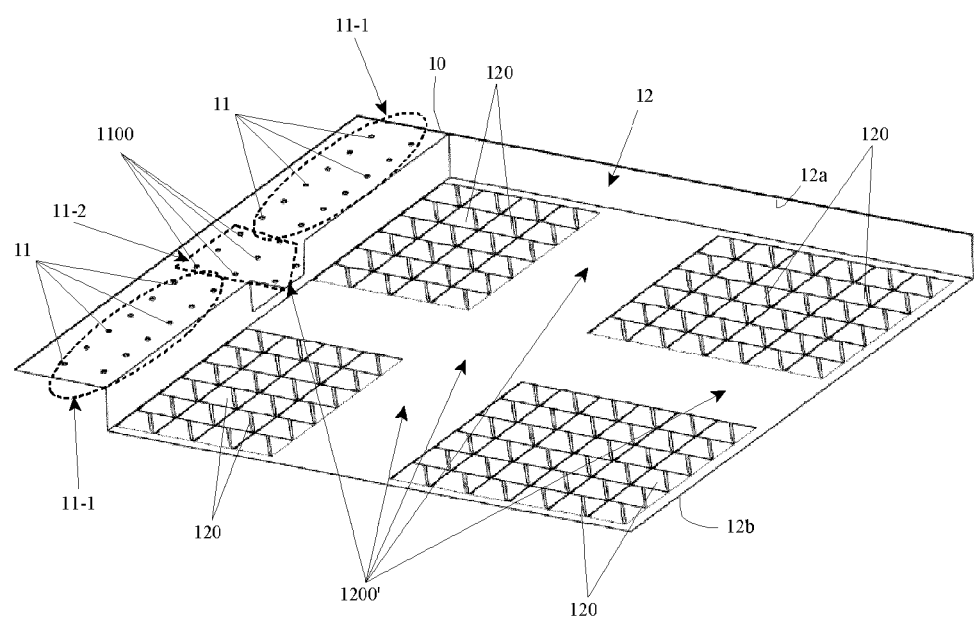

FIGS. 8a and 8b depict two further embodiments of an illumination device according to the disclosure. In these embodiments, the support structure 10 is provided with the array of plurality of spatially separated solid state lighting elements 11, which are mounted on the first side 10a of the support structure 10. The array of plurality of spatially separated solid state lighting elements 11 is in this embodiment one of two distinct arrays, each array consisting of a plurality of spatially separated solid state lighting elements.

The pattern of the first array (denoted with reference numeral 11-1) of plurality of spatially separated solid state lighting elements 11 is conformal to the pattern of the array of the plurality of recessed portions 120, as outlined with respect to e.g. FIGS. 2a and 2b. Similarly, the first array 11-1 of plurality of spatially separated solid state lighting elements 11 can be conformal to the pattern of the array of the plurality of elevated portions 122, in a similar manner as outlined with respect to e.g. FIGS. 2c and 2d.

Additionally, the support structure 10 is provided with a further array of plurality of spatially separated solid state lighting elements. This further array is denoted with reference numeral 11-2 and the plurality of spatially separated solid state lighting elements associated with this further array 11-2 are denoted with reference numeral 1100.

The plurality of spatially separated solid state lighting elements 11 and 1100 belonging to each first and further array 11-1 and 11-2, respectively, can be different from each other in terms of lighting color and can be controlled separately from each other by the control circuitry of the illumination device 100. Alternatively, the solid state lighting elements 11 and 1100 belonging to each first and further array 11-1 and 11-2 can be controlled in a simultaneous and identical manner.

The optical element 12 is provided with an auxiliary recess portion 1200, the shape (or geometrical dimensions) of the auxiliary recess portion being conformal to the shape (or geometrical dimensions) of the further array 11-2 of the plurality of spatially separated solid state lighting elements 1100. The shape or form of the auxiliary recess 1200 can be arbitrarily chosen, for example in the shape of a cross as depicted in these examples.

Also in this example, two embodiments are depicted in FIGS. 8a and 8b. In FIG. 8a, the auxiliary recess portion 1200 is facing away from the support structure 10 as it is applied in the front surface or light emission window 12b of the optical element 12, whereas in FIG. 8b the auxiliary recess portion 1200 is facing towards the support structure as the recess portion 1200 is applied in the back surface 12a of the optical element 12. Both configurations allow for different illuminations, either diffuse or homogenous light due to the separate control of the first and further array 11-1 and 11-2 of solid state lighting elements 11 and 1100, respectively. In particular, the light distribution from the separate solid state lighting elements 11 of the array 11-1 interacting with corresponding separate recessed portions or cups 120 create a more narrow light beam, resulting in a more office compliant lighting experience. The solid state lighting elements 1100 of the other array 11-2, which interact with the enlarged auxiliary recess 1200 provide a uniform light distribution.

Thus, an additional functionality of the illumination device is provided. Although in FIGS. 8a and 8b two separate arrays 11-1 and 11-2 of solid state lighting elements 11 and 1100, respectively are used, it is clear that more than two distinct arrays 11-n (with n being 2, 3, 4 or more) can be implemented, each array interacting with different recesses 120, 1200, etc.

Returning to FIGS. 2a and 2b, the circumferential side wall 120b of each recessed portion 120 is arranged under an angle α with respect to the plane of the support structure 10, the plane being formed by the first side 10a thereof. The angle α ranges between 50° to 80°, and preferably ranges between 55° to 70°. This range of angles α of the circumferential side wall 120b of each recessed portion 120 provide a uniform light emission distribution of diffuse light being emitted by the array of the plurality, corresponding solid state light emitting devices 11 and exiting the light emission window 12b, whilst sufficiently shielding off the light emission at higher angles towards the (office) space wherein the illumination device 100 is installed.

Please note, that the angle α of the side walls 120b of each recessed portion 120 is explained with reference to the embodiment of the recessed portion 120 having a circular, cone-shaped circumference (FIGS. 2a and 2b). However, it is observed that the disclosed range of angles α equally applies to a side wall 120b of a recessed portion 120 having another circumferential shape. The angle α is equally applicable to a recessed side wall 120b of polygon-shaped recessed portion 120 as described in FIG. 3 and FIGS. 5a-5b as well as applicable to the reversed configuration of the optical element 12 of FIG. 2c-2d.

As to additional dimensions of each recessed portion or reflector cup 120, a maximum depth d of a recessed portion preferable amounts 50-70% of a maximum thickness D (seen between both back and front surfaces 12a-12b) of the optical element 12-12'-12"-12'". In particular, the optical element 12-12'-12"-12'" has a maximum thickness D of 20-30 mm, in particular 25 mm. Herewith the optical element 12-12'-12"-12'" provides sufficient mechanical strength to the construction of the illumination device 100, and in addition provides an effective light emission distribution of diffuse and scattered light via the recessed portions or reflector cups 120.

LISTING OF REFERENCE NUMERALS USED 100 illumination device
10 support structure
10a first side of support structure 10
10b second, opposite side of support structure 10
11 (array of) plurality spatially separated solid state lighting elements
12 optical (diffuser) element (first example)
12' optical (diffuser) element (second example)
12" optical (diffuser) element (third example)
12'" optical (diffuser) element (fourth example)
12a back surface/of optical (diffuser) element 12-12'-12"-12'"-12""
12b front, opposite side of optical (diffuser) element 12-12'-12"-12'"-12""
12c concave 12d pattern of concaves
120 recessed portion in optical (diffuser) element 12-12'-12"-12'"-12""
120a (closed) bottom wall of recessed portion 120
120b (circumferential) side wall section of recessed portion 120
120c intermediate wall section or apex between recessed portions 120
120d (open) light exit window
121 closed-cells
122 elevated portion in optical (diffuser) element 12-12'-12"-12'"-12""
1000 ceiling
D maximum thickness dimension of optical element 12-12'-12"-12'"-12""
Tr (local) thickness dimension of optical element at recessed portion
d depth dimension of recessed portion 120 of optical element 12-12'-12"-12'"-12""
x1 length dimension of closed bottom wall 120a
x2 length dimension of intermediate wall section 120c
α angle of (circumferential) side wall section 120b with respect to support structure 10

The invention claimed is:

1. An illumination device comprising a support structure having a first side with mounted thereon:
a plurality of spatially separated solid state lighting elements disposed in an array, and
an optical element made of a solid, light transmissive, light diffusing, foam material,
wherein the optical element is provided with a pattern of concaves, essentially each concave being formed by:
a recessed portion of the concaves comprising a closed bottom wall,
a circumferential side wall extending from the closed bottom wall to a light exit window, the light exit window bordering an apex of an elevated portion of the concaves and opposite to the closed bottom wall, and
wherein the plurality of spatially separated solid state elements is arranged outside and upstream of the concaves and conformal to said pattern of concaves.

2. The illumination device according to claim 1, wherein the optical element has a back surface and a front surface opposite to the back surface of the optical element, wherein the optical element is mounted with said back surface on said first side of the support structure and downstream of the solid state elements, and wherein the optical element has a maximum thickness D between the back surface and the front surface at the apex of the elevated portions at least two times larger than the thickness Tr between the back surface and the front surface at the recessed portions.

3. The illumination device according to claim 2, wherein thickness Tr is in between 0.3*D and 0.5*D.

4. The illumination device according to claim 1, wherein the back surface is essentially flat.

5. The illumination device according to claim 1, wherein the solid state elements are partly recessed or partly embedded in the optical element at said back surface.

6. The illumination device according to claim 1, wherein the optical element is made in one piece.

7. The illumination device according to claim 1, wherein the array of the plurality of recessed portions is conformal to the array of the plurality of spatially separated solid state lighting elements.

8. The illumination device according to claim 1, wherein the array of the plurality of elevated portions is conformal to the array of the plurality of spatially separated solid state lighting elements.

9. The illumination device according to claim 1, wherein the solid foam material is a solid closed-cell foam material having a closed-cell volume of at least 80 volume-%.

10. The illumination device according to claim 9, wherein the closed-cells have a diameter in the range of 0.2-1.7 mm.

11. The illumination device according to claim 1, wherein the pattern formed of the array of the plurality of recessed portions and the array of the plurality of elevated portions have a polygon-shaped, an elliptical-shaped or a pyramidal-shaped circumference.

12. The illumination device according to claim 1, wherein the plurality of recessed portions having recessed side walls arranged under an angle α with respect to the structure, with α in a range of 50° to 80°.

13. The illumination device according to claim 1, wherein the support structure is provided with a further plurality of spatially separated solid state lighting elements disposed in an array mounted on the first side of the support structure and wherein the pattern formed of the array of the plurality of recessed portions and the array of the plurality of elevated portions is provided with an auxiliary recess conformal to the further plurality of spatially separated solid state lighting elements.

14. A luminaire comprising:
an illumination device according to claim 1.

15. An optical element for use in an illumination device according to claim 1 or in a luminaire according to claim 14, the optical element being made of a solid, light transmissive, light diffusing, foam material and provided with a pattern of concaves, wherein essentially each concave is formed by:
a recessed portion of the concaves comprising a closed bottom wall,
a circumferential side wall extending from the closed bottom wall to a light exit window, the light exit window bordering an apex of an elevated portion of the concaves and opposite to the closed bottom wall.

* * * * *